(12) United States Patent
Jeong et al.

(10) Patent No.: US 7,642,808 B2
(45) Date of Patent: Jan. 5, 2010

(54) IMPEDANCE ADJUSTING CIRCUIT AND SEMICONDUCTOR MEMORY DEVICE HAVING THE SAME

(75) Inventors: Chun-Seok Jeong, Kyoungki-do (KR); Kang-Seol Lee, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 0 days.

(21) Appl. No.: 12/005,905

(22) Filed: Dec. 28, 2007

(65) Prior Publication Data

US 2009/0002018 A1 Jan. 1, 2009

(30) Foreign Application Priority Data

Jun. 26, 2007 (KR) .................. 10-2007-0063312

(51) Int. Cl.
*H03K 19/003* (2006.01)
(52) U.S. Cl. .......................... 326/30; 326/26
(58) Field of Classification Search .............. 326/30
See application file for complete search history.

(56) References Cited

U.S. PATENT DOCUMENTS

| | | | | |
|---|---|---|---|---|
| 6,525,558 | B2 * | 2/2003 | Kim et al. ............... | 326/30 |
| 6,762,620 | B2 * | 7/2004 | Jang et al. .............. | 326/30 |
| 6,958,613 | B2 | 10/2005 | Braun et al. | |
| 6,980,020 | B2 | 12/2005 | Best et al. | |
| 7,151,390 | B2 | 12/2006 | Nguyen et al. | |
| 7,170,313 | B2 | 1/2007 | Shin | |
| 7,176,711 | B2 | 2/2007 | Park et al. | |

FOREIGN PATENT DOCUMENTS

| | | |
|---|---|---|
| JP | 2005-285125 | 10/2005 |
| JP | 2006-129423 | 5/2006 |
| KR | 20040055879 | 6/2004 |
| KR | 20070016773 | 2/2007 |

* cited by examiner

*Primary Examiner*—James Cho
(74) *Attorney, Agent, or Firm*—Blakely, Sokoloff, Taylor & Zafman LLP

(57) ABSTRACT

An impedance adjusting circuit includes: a first calibration resistor circuit configured to be calibrated with an external resistor and generate a first calibration code; a second calibration resistor circuit configured to be calibrated with the first calibration resistor circuit and generate a second calibration code, the second calibration resistor circuit being connected to a first node; and a transmission line circuit configured to be responsive to a control signal to connect the first node to a pin of a system employing the impedance adjusting circuit.

13 Claims, 4 Drawing Sheets

IMPEDANCE ADJUSTING CIRCUIT AND SEMICONDUCTOR MEMORY DEVICE HAVING THE SAME

CROSS-REFERENCE TO RELATED APPLICATIONS

The present invention claims priority of Korean patent application number 10-2007-0063312, filed on Jun. 26, 2007, which is incorporated by reference in its entirety.

BACKGROUND OF THE INVENTION

The present invention relates to an impedance adjusting circuit used in various integrated circuits such as a semiconductor memory device, and more particularly, to an impedance adjusting circuit configured to easily measure an offset value.

Semiconductor devices are implemented into integrated circuit (IC) chips such as central processing units (CPUs), memories, and gate arrays, and are incorporated into a variety of electrical products such as personal computers, servers and workstations. Most semiconductor devices include a receiving circuit configured to receive signals from an outside world via input pads and an output circuit configured to provide internal signals to an outside world via output pads.

As the operating speed of electrical products is increasing, a swing width of a signal exchanged between semiconductor devices is being gradually reduced for minimizing a delay time taken for signal transmission. However, the reduction in the swing width of the signal has a great influence on an external noise, causing the signal reflectance to become more critical at an interface terminal due to impedance mismatch. Such impedance mismatch is generally caused by an external noise, a variation of a power supply voltage, a change in an operating temperature, a change in a manufacturing process, etc. The impedance mismatch may lead to a difficulty in high-speed transmission of data and distortion in output data. Therefore, if semiconductor devices receive the distorted output signal through an input terminal, it frequently gives rise to problems such as a setup/hold failure and an error in decision of an input level.

In particular, in order to resolve the above problems, a memory device requiring high-speed performance employs an impedance adjusting circuit near an input pad inside an IC chip. In a typical impedance adjusting circuit scheme, source termination is performed at a transmitting end by an output circuit, and parallel termination is performed by a termination circuit connected in parallel with respect to a receiving circuit coupled to the input pad.

A ZQ calibration refers to a procedure of generating pull-up and pull-down codes which are varied with PVT (process, voltage and temperature) conditions. The resistance of the impedance adjusting circuit, e.g., a termination resistance at a DQ pad in a memory device, is calibrated using the codes resulting from the ZQ calibration. Here, the term of ZQ calibration is attributed to the fact that the calibration is performed using a ZQ node.

Hereinafter, how the ZQ calibration is performed in an impedance adjusting circuit will be described.

FIG. 1 is a block diagram of a calibration circuit for performing a ZQ calibration in a conventional impedance adjusting circuit.

Referring to FIG. 1, the conventional impedance adjusting circuit configured to perform ZQ calibration includes a first calibration resistor circuit 110, a second calibration resistor circuit 120 and 130, a reference voltage generator 102, first and second comparators 103 and 104, and pull-up and pull-down counters 105 and 106. The first calibration resistor circuit 110 is provided with a plurality of pull-up resistors which are turned on/off in response to a pull-up calibration code PCODE<0:N>. The second calibration resistor circuit 120 and 130 includes a pull-up calibration resistor unit 120 and a pull-down calibration resistor unit 130. Here, the pull-up calibration resistor unit 120 has the same construction as the first calibration resistor circuit 110. The pull-down calibration resistor unit 130 is provided with a plurality of pull-down resistors which are turned on/off in response to a pull-down calibration code NCODE<0:N>.

The first calibration resistor circuit 110 generates the pull-up calibration code PCODE<0:N> primarily while being calibrated with an external resistor 101 connected to a ZQ node. The second calibration resistor circuit 120 and 130 generates the pull-down calibration code NCODE<0:N> secondarily using the pull-up calibration code PCODE<0:N> which has been generated through the first calibration resistor circuit 110.

The first comparator 103 compares a ZQ node voltage at the ZQ node with a reference voltage VREF (generally, set to VDDQ/2) generated from the reference voltage generator 102, thereby generating up/down signals UP/DOWN. Herein, the ZQ node voltage is generated by coupling the first calibration resistor circuit 110 to the external resistor 101 (generally, 240 Ω) connected to a ZQ pin that is disposed outside a chip of the ZQ node.

The pull-up counter 105 receives the up/down signals UP/DOWN to generate the pull-up calibration code PCODE<0:N> as a binary code, which turns on/off the pull-up resistors connected in parallel in the first calibration resistor circuit 110, thereby calibrating total resistance of the first calibration resistor circuit 110. The calibrated resistance of the first calibration resistor circuit 110 affects the ZQ node voltage again, and the above-described calibration procedure is then repeated. That is, the first calibration resistor circuit 110 is calibrated such that the total resistance of the first calibration resistor circuit 110 is equal to the resistance of the external resistor 101, which is called a pull-up calibration.

The binary code, i.e., the pull-up calibration code PCODE<0:N>, generated during the pull-up calibration is inputted into the pull-up calibration resistor unit 120 of the second calibration resistor circuit 120 and 130, thereby determining total resistance of the pull-up calibration resistor unit 120. Thereafter, a pull-down calibration starts to be performed in a similar manner to the pull-up calibration. Specifically, the pull-down calibration is performed such that a voltage of a node A is equal to the reference voltage VREF using the second comparator 104 and the pull-down counter 106, that is, the total resistance of the pull-down calibration resistor unit 130 is equal to the total resistance of the pull-up calibration resistor unit 120.

The binary codes PCODE<0:N> and NCODE<0:N> resulting from the ZQ calibration, i.e., pull-up and pull-down calibrations, are inputted to pull-up and pull-down resistors (termination resistors) at input/output pads, which are identically configured to the pull-up and pull-down calibration resistor units in the calibration resistor circuit of FIG. 1, thus determining resistance of the impedance adjusting circuit. In a memory device, resistances of pull-up and pull-down resistors at a DQ pad are determined.

For reference, although both pull-up and pull-down calibration operations are performed to generate the pull-up calibration codes PCODE<0:N> and the pull-down calibration codes NCODE<0:N> for determining resistances of the pull-up and pull-down calibration resistor units of the conventional impedance adjusting circuit, the impedance adjusting circuit needs not necessarily include both the pull-up and pull-down termination resistor circuits in the impedance adjusting circuit. For example, both the pull-up and pull-down resistor circuits are used at a side of an output driver in the case of a semiconductor memory device, but only the pull-up termination resistor circuit is used at a side of an input buffer.

Therefore, if the impedance adjusting circuit includes only the pull-up termination resistor circuit at input/output pads, the calibration resistor circuit of FIG. 1 only includes the pull-up calibration resistor circuit 110, the pull-up counter 105 and the first comparator 103, which are configured to generate the pull-up calibration codes PCODE<0:N>. An operation of this case is the same as the above-described pull-up calibration.

FIG. 2 is a block diagram illustrating how termination resistance of an output driver of a semiconductor memory device is determined using the calibration codes PCODE<0:N> and NCODE<0:N> generated from the calibration circuit of FIG. 1.

The output driver configured to output data in the semiconductor memory device includes first and second pre-drivers 210 and 220 located at its upper and lower parts, and pull-up and pull-down termination resistor units 230 and 240 for outputting data.

The first and second pre-drivers 210 and 220 control the pull-up termination resistor unit 230 and the pull-down resistor unit 240, respectively. When outputting a data having a logic high level, the pull-up termination resistor unit 230 is turned on so that a data pin DQ goes to 'HIGH' state. On the contrary, when outputting a data having a logic low level, the pull-down termination resistor unit 240 is turned on so that the data pin DQ goes to 'LOW' state. That is, the data pin DQ is pull-up or pull-down terminated to thereby output a data of a logic high level or a logic low level.

At this time, the number of resistors in the pull-up and pull-down termination resistors 230 and 240 to be turned on is determined by the pull-up and pull-down calibration codes PCODE<0:N> and NCODE<0:N>. Specifically, which resistor unit is turned on between the pull-up and pull-down termination resistor units 230 and 230 is mainly determined depending on a logic level of output data, but which resistor is turned on among the termination resistors provided in one of the termination resistor units 230 and 240 that has been selected to be turned on is determined by the pull-up calibration code PCODE<0:N> or pull-down calibration code NCODE<0:N>.

For reference, target resistances of the pull-up and pull-down resistor units 230 and 240 are not necessarily equal to resistances (240 Ω) of the first and second resistor circuits (see "110", "120" and "130" of FIG. 1) but may have a resistance of one-half (120 Ω) or one-quarter (60 Ω) of 240 Ω, etc. In FIG. 2, reference symbols "DQP_CTRL" and "DQN_CTRL" inputted to the first and second pre-drivers 210 and 220 denote various control signals exemplarily.

The ZQ calibration operation of the conventional impedance adjusting circuit is based on the assumption that there is no mismatch between the calibration resistors (110, 120 and 130 of FIG. 1) and the termination resistors 230 and 240 and the resistance can be increased or decreased at a predetermined ratio.

However, mismatch exists between the resistors due to process variation or the like. Hence, the termination resistor may not have a target resistance due to several factors such as an offset of a comparator in the calibration circuit, a noise in a power supply voltage, a line loading, pad resistance and package resistance.

In the conventional impedance adjusting circuit, the ZQ calibration can be verified only by specifying resistance of the termination resistor. That is, the termination resistance can be measured by directly connecting a DQ pin to the termination resistor but there is no way to measure the resistance of the calibration resistor. In particular, it is difficult to measure an internal voltage level after being packaged, which may lead to more serious problems.

That is, the conventional impedance adjusting circuit has a problem in that it is not easy to find out which portion of the impedance adjusting circuit gives rise to a trouble when the ZQ calibration does not normally operate.

SUMMARY OF THE INVENTION

Embodiments of the present invention are directed to providing an impedance adjusting circuit that can directly measure calibration resistance of the impedance adjusting circuit to easily analyze a calibration operation, and a semiconductor memory device having the impedance adjusting circuit.

In accordance with an aspect of the present invention, there is provided an impedance adjusting circuit, including: a first calibration resistor circuit configured to be calibrated with an external resistor and generate a first calibration code; a second calibration resistor circuit configured to be calibrated with the first calibration resistor circuit and generate a second calibration code, the second calibration resistor circuit being connected to a first node; and a transmission line circuit configured to be responsive to a control signal to connect the first node to a pin of a system employing the impedance adjusting circuit.

In accordance with another aspect of the present invention, there is provided a semiconductor memory device, including: a first calibration resistor circuit configured to be calibrated with an external resistor and generate a first calibration code; a second calibration resistor circuit configured to be calibrated with the first calibration resistor circuit and generate a second calibration code, the second calibration resistor circuit being connected to a first node; and a transmission line circuit configured to be responsive to a control signal to connect the first node to a pin of the semiconductor memory device.

DESCRIPTION OF SPECIFIC EMBODIMENTS

Hereinafter, an impedance adjusting circuit and a semiconductor memory device having the same in accordance with the present invention will be described in detail with reference to the accompanying drawings.

Figure 1:
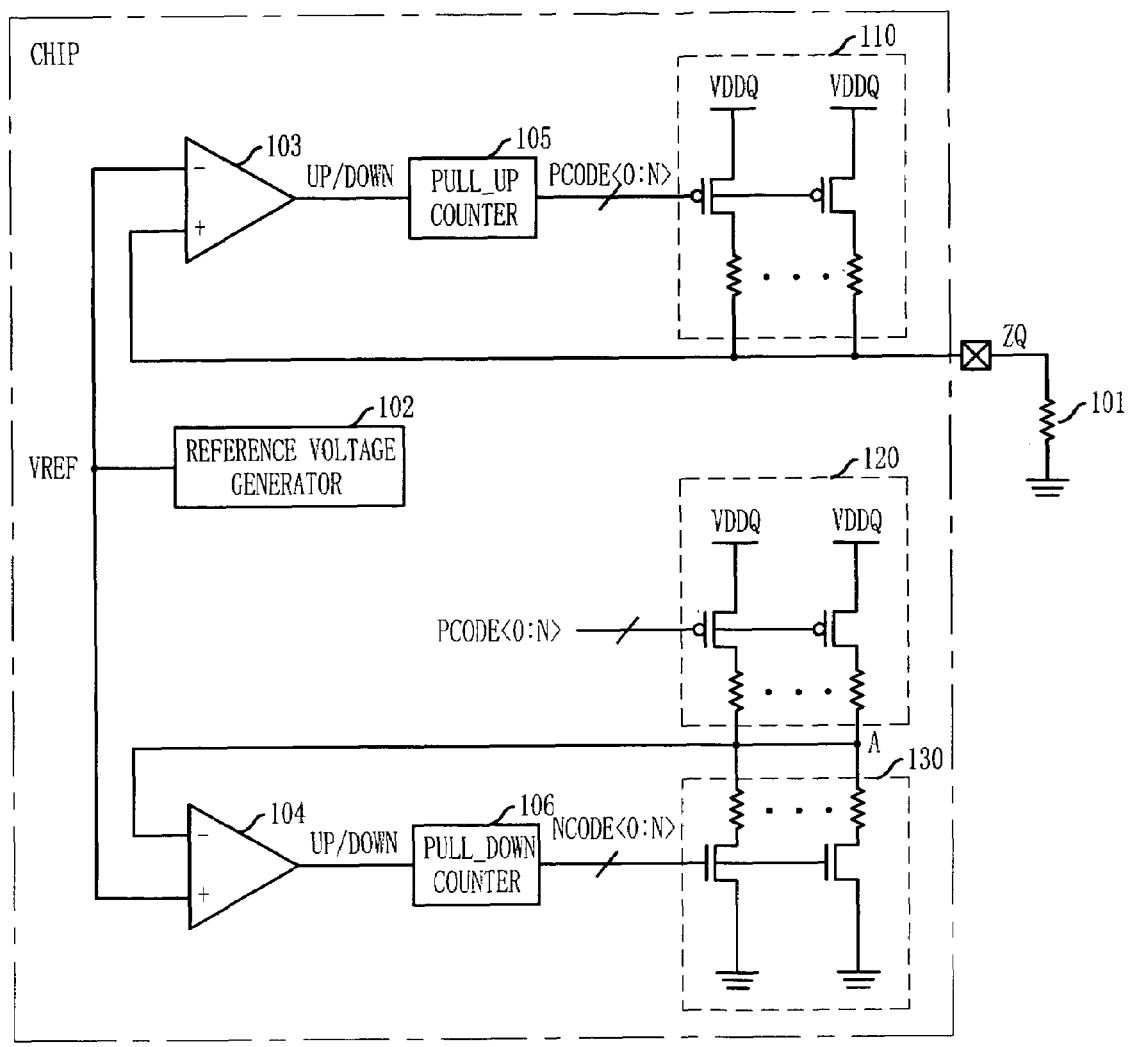
FIG. 1 is a block diagram of a calibration circuit for performing a ZQ calibration in a conventional impedance adjusting circuit.
Figure 2:
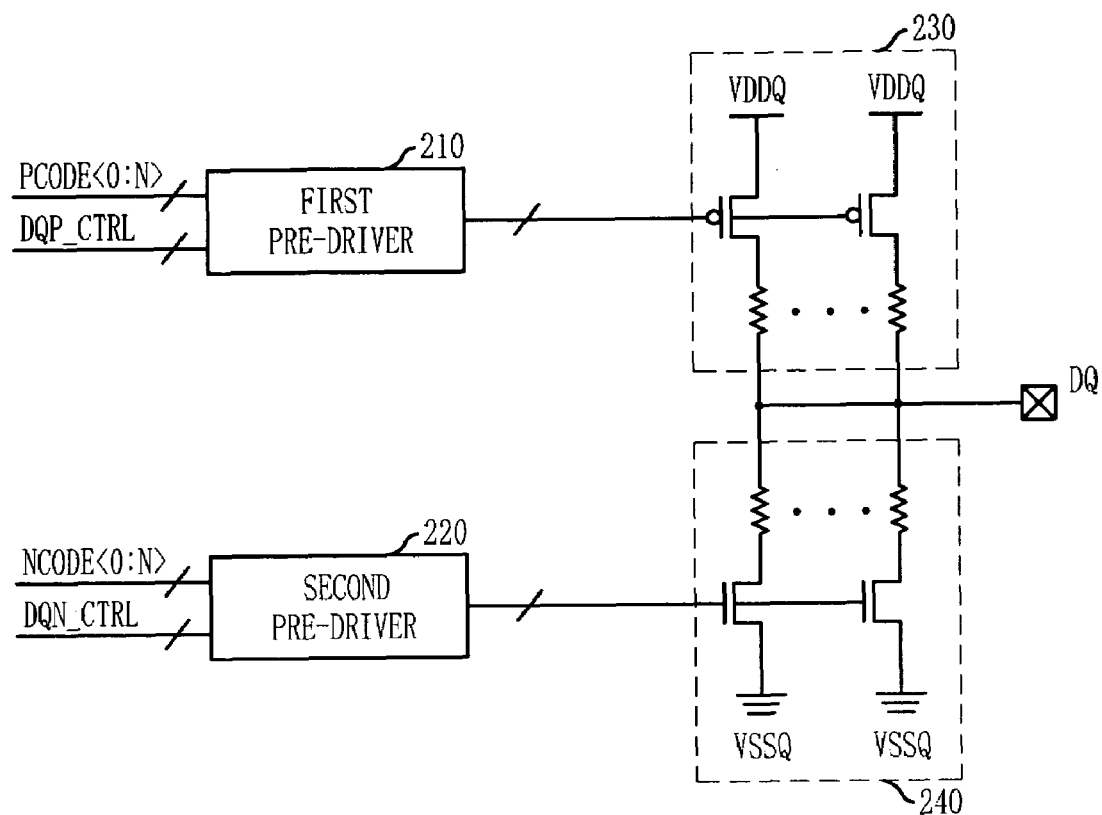
FIG. 2 is a block diagram illustrating how termination resistance of an output driver of a semiconductor memory device is determined using calibration codes generated from the calibration circuit of FIG. 1.
Figure 3:
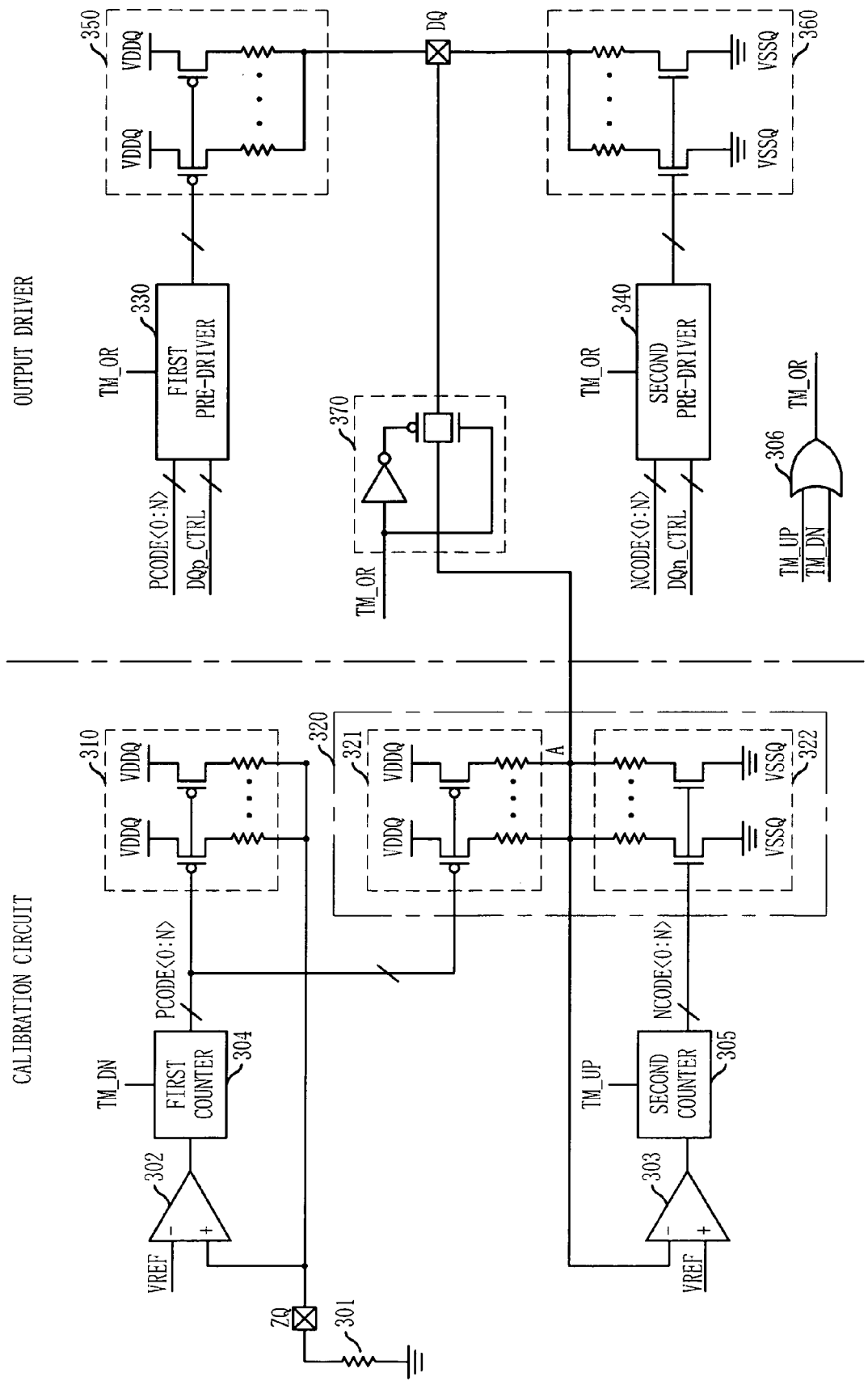
FIG. 3 is a block diagram of an impedance adjusting circuit applied to a semiconductor memory device in accordance with an embodiment of the present invention.

FIG. 3 is a block diagram of an impedance adjusting circuit applied to a semiconductor memory device in accordance with an embodiment of the present invention.

Referring to FIG. 3, the impedance adjusting circuit of the present invention includes first and second comparators 302 and 303, first and second counters 304 and 305, a first calibration resistor circuit 310, a second calibration resistor circuit 320, and a transmission line circuit 370. The first calibration resistor circuit is calibrated with an external resistor 301 and generates a first calibration code PCODE<0:N>. The second calibration resistor circuit 320 is calibrated with the first calibration resistor circuit 310 and generates a second calibration code NCODE<0:N>, the second calibration resistor circuit 320 being connected to a first node A. The transmission line circuit 370 connects the first node A to a data pin DQ heading for the outside of a system employing the impedance adjusting circuit in response to a control signal TM_OR.

The first calibration resistor circuit 310 generates the first calibration code PCODE<0:N> while being calibrated so as to have the same resistance as the external resistor 301.

Likewise, the second calibration resistor circuit 320 generates the second calibration code NCODE<0:N> while being calibrated so as to have the same resistance as the first calibration resistor circuit 310. The second calibration resistor circuit 320 includes a pull-up calibration resistor unit 321 having the same structure as that of the first calibration resistor circuit 310, and a pull-down calibration resistor unit 322. In the same manner as the conventional art, the pull-up calibration resistor unit 321 receives the first calibration code PCODE<0:N> to have the same resistance as the first calibration resistor circuit 310, and the pull-down calibration resistor unit 322 generates the second calibration code NCODE<0:N> while being calibrated so as to have the same resistance as that of the pull-up calibration resistor unit 321.

Figure 4A:
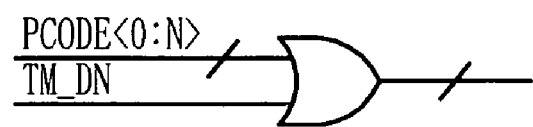
FIGS. 4A and 4B illustrate circuits required for turning off each resistor unit by a pull-up test signal, a pull-down test signal and a control signal.

The pull-up calibration resistor unit 321 is controlled by the first calibration code PCODE<0:N> to turn on/off internal resistors during a normal operation. However, when a pull-down test signal TM_DN is activated, the internal resistors are all turned off regardless of the first calibration code PCODE<0:N>. Here, the pull-down test signal TM_DN is activated when testing the resistance of the pull-down calibration resistor unit 322. This can be implemented in various ways. For example, it may be possible to simply implement the calibration circuit by inserting a circuit of FIG. 4A to an output terminal of the first counter 304. The circuit of FIG. 4A is configured with as many OR gates as the number of codes.

Figure 4B:
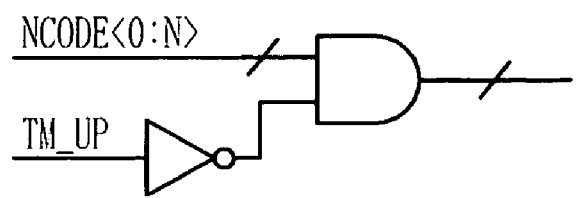

The pull-down calibration resistor unit 322 is controlled by the second calibration code NCODE<0:N> to turn on/off the internal resistors during the normal operation. However, when a pull-up test signal TM_UP is activated, the internal resistors are all turned off regardless of the second calibration code NCODE<0:N>. Here, the pull-up test signal TM_UP is activated when testing the resistance of the pull-up calibration resistor unit 321. This can also be implemented in various ways. For example, it may be possible to simply implement the calibration circuit by inserting a circuit of FIG. 4B to an output terminal of the second counter 305. The circuit of FIG. 4B is configured with as many AND gates and inverters as the number of codes.

The transmission line circuit 370 is responsive to the control signal TM_OR to connect the first node A to the data pin DQ heading for the outside of a system employing the impedance adjusting circuit. That is, when the control signal TM_OR is activated, the first node A is connected to the DQ pin heading for the outside of the system so that the resistance of the second calibration resistor 320 can be directly measured through the DQ pin. Any pin of the system is available if the circuit is designed such that the other functions of the pin are disabled when the control signal TM_OR is activated. It is preferable to use the closest possible pin to the first node A, in consideration of line loading and noise.

The control signal TM_OR may be set such that it is activated when one of the pull-up and pull-down test signals TM_UP and TM_DN is activated as shown in FIG. 3.

FIG. 3 exemplarily illustrates that the impedance adjusting circuit is applied to a semiconductor memory device and the data pin DQ of the semiconductor memory device is used as a pin heading for the outside of the system, which will be more fully described below. Since there are several data pins DQ in the semiconductor memory device, it is preferable to use the data pin DQ located closest to the first node A.

The semiconductor memory device outputs data through the data pin DQ using an output driver. The output driver includes first and second pre-drivers 330 and 340 located at upper and lower parts, a pull-up termination resistor unit 350 and a pull-down resistor unit 360. Because a data-outputting function of the data pin DQ must be disabled during the test mode when the control signal TM_OR is activated, all the resistors in the pull-up and pull-down termination resistor units 350 and 360 must be turned off if the control signal TM_OR is activated.

To turn off all the resistors in the pull-up termination resistor unit 350 during the activation of the control signal TM_OR, the circuit of FIG. 4A may be inserted to an output terminal of the first pre-driver 330. In this case, the circuit of FIG. 4A is configured such that it receives the control signal TM_OR instead of the pull-down test signal TM_DN. To turn off all the resistors in the pull-down termination resistor unit 360 during the activation of the control signal TM_OR, the circuit of FIG. 4B can be inserted to an output terminal of the second pre-driver 340. In this case, the circuit of FIG. 4B is configured such that it receives the control signal TM_OR instead of the pull-up test signal TM_UP.

A code generator is configured with the first and second comparators 302 and 303 and the first and second counters 304 and 305. The code generator compares a ZQ node voltage at a node ZQ with a reference voltage VREF (generally, set to VDDQ/2) in the same manner as the conventional art, thus generating the first calibration code PCODE<0:N>. Likewise, the code generator compares a voltage of the first node A with the reference voltage VREF to generate the second calibration code NCODE<0:N>.

Hereinafter, an overall operation of the impedance adjusting circuit in accordance with the present invention will be described.

In the case of measuring the resistance of the pull-up calibration resistor unit 321 of the second calibration resistor circuit 320, the pull-up test signal TM_UP is activated, and the control signal TM_OR is then activated. Accordingly, the first node A is connected to the data pin DQ, and the pull-down calibration resistor unit 322 is turned off. The pull-up and pull-down termination resistor units 350 and 360 of the output driver are also turned off. Therefore, the resistance of the pull-up calibration resistor unit 321 can be measured by applying a predetermined voltage to the data pin DQ and measuring corresponding current.

In the case of measuring the resistance of the pull-down calibration resistor unit 322 of the second calibration resistor circuit 320, the pull-down test signal TM_DN is activated, and the control signal TM_OR is then activated. Accordingly, the first node A is connected to the data pin DQ, and the pull-up calibration resistor unit 321 is turned off. The pull-up and pull-down termination resistor units 350 and 360 of the output driver are also turned off. Therefore, the resistance of the pull-down calibration resistor unit 322 can be measured by applying a predetermined voltage to the data pin DQ and measuring corresponding current.

FIGS. 4A and 4B illustrate circuits required for turning off each resistor unit 321, 322, 350 and 360 by the pull-up test signal TM_UP, the pull-down test signal TM_DN and the control signal TM_OR.

In an impedance adjusting circuit and a semiconductor memory device having the same in accordance with the present invention, a node connected to the calibration resistor unit is connected to a pin heading for the outside of a chip, thus directly measuring the resistance of the calibration resistor circuit through the pin.

Accordingly, when the calibration operation of the impedance adjusting circuit does not operate normally, it can be easy to find out which portion of the impedance adjusting circuit gives rise to a trouble.

In a semiconductor memory device, it is possible to effectively analyze the signal integrity of data output as well as to verify the calibration operation of the impedance adjusting circuit.

While the present invention has been described with respect to the specific embodiments, it will be apparent to those skilled in the art that various changes and modifications may be made without departing from the spirit and scope of the invention as defined in the following claims.

What is claimed is:

1. A semiconductor memory device, comprising:
    a plurality of pins through which signals are inputted or outputted;
    a calibration resistor circuit configured to be calibrated with an external resistor and generate calibration codes to determine termination resistance of the plurality of pins; and
    a transmission line circuit configured to be responsive to a control signal to connect a first node of the calibration resistor circuit to a first pin of the plurality of pins to measure resistance of the calibration resistor circuit.

2. The semiconductor memory device as recited in claim 1, wherein, when the control signal is activated, the first node and the first pin are connected to each other, and signals-inputting/outputting functions of the first pin are disabled.

3. The semiconductor memory device as recited in claim 1, wherein the plurality of pins are for coupling to at least one device external to the semiconductor memory device.

4. The semiconductor memory device as recited in claim 1, wherein the calibration resistor circuit includes:
    a first calibration resistor circuit configured to be calibrated with the external resistor and generate a first calibration code; and
    a second calibration resistor circuit configured to be calibrated with the first calibration resistor circuit and generate a second calibration code, the second calibration resistor circuit being connected to the first node.

5. The semiconductor memory device as recited in claim 4, wherein the second calibration resistor circuit includes a pull-up calibration resistor unit and a pull-down calibration resistor unit which are connected to the first node, the pull-up calibration resistor unit having the same construction as the first calibration resistor circuit.

6. The semiconductor memory device as recited in claim 5, wherein a plurality of internal resistors in the pull-up calibration resistor unit of the second calibration resistor circuit receive the first calibration code to be turned on/off, and the internal resistors are turned off when a pull-down test signal is activated.

7. The semiconductor memory device as recited in claim 6, wherein a plurality of internal resistors in the pull-down calibration resistor unit of the second calibration resistor circuit receive the second calibration code to be turned on/off, and the internal resistors in the pull-down calibration resistor unit are turned off when a pull-up test signal is activated.

8. The semiconductor memory device as recited in claim 7, wherein the control signal is activated when the pull-up test signal or the pull-down test signal is activated.

9. The semiconductor memory device as recited in claim 4, wherein the pins include data pins, and the semiconductor memory device further comprises a pull-up termination resistor unit and a pull-down termination resistor unit connected to the data pins.

10. The semiconductor memory device as recited in claim 9 wherein resistance of the pull-up termination resistor unit is determined in response to the first calibration code, and resistors in a first pull-up termination resistor unit connected to the first pin are turned off when the control signal is activated.

11. The semiconductor memory device as recited in claim 9, wherein resistance of the pull-down termination resistor unit is determined in response to the second calibration code, and resistors in a first pull-down termination resistor unit connected to the first pin are turned off when the control signal is activated.

12. The semiconductor memory device as recited in claim 4, wherein the first calibration code is generated by comparing a voltage level of a ZQ node with a voltage level of a reference voltage, the external resistor and the first calibration resistor circuit being connected to the ZQ node, and the second calibration code is generated by comparing a voltage level of the first node and that of the reference voltage.

13. The semiconductor memory device as recited in claim 1, wherein the first pin includes a data pin located closest to the first node.

* * * * *